Jan. 26, 1954 H. N. STEPHAN 2,667,105
COMBINED HORIZONTAL BORING, DRILLING, AND MILLING MACHINE
Filed April 21, 1950 6 Sheets-Sheet 1

INVENTOR.
HALLIS N. STEPHAN
BY
ATTORNEYS

Jan. 26, 1954　　　　　H. N. STEPHAN　　　　　2,667,105
COMBINED HORIZONTAL BORING, DRILLING, AND MILLING MACHINE
Filed April 21, 1950　　　　　　　　　　　　　　6 Sheets-Sheet 2

INVENTOR.
HALLIS N. STEPHAN
BY
ATTORNEYS

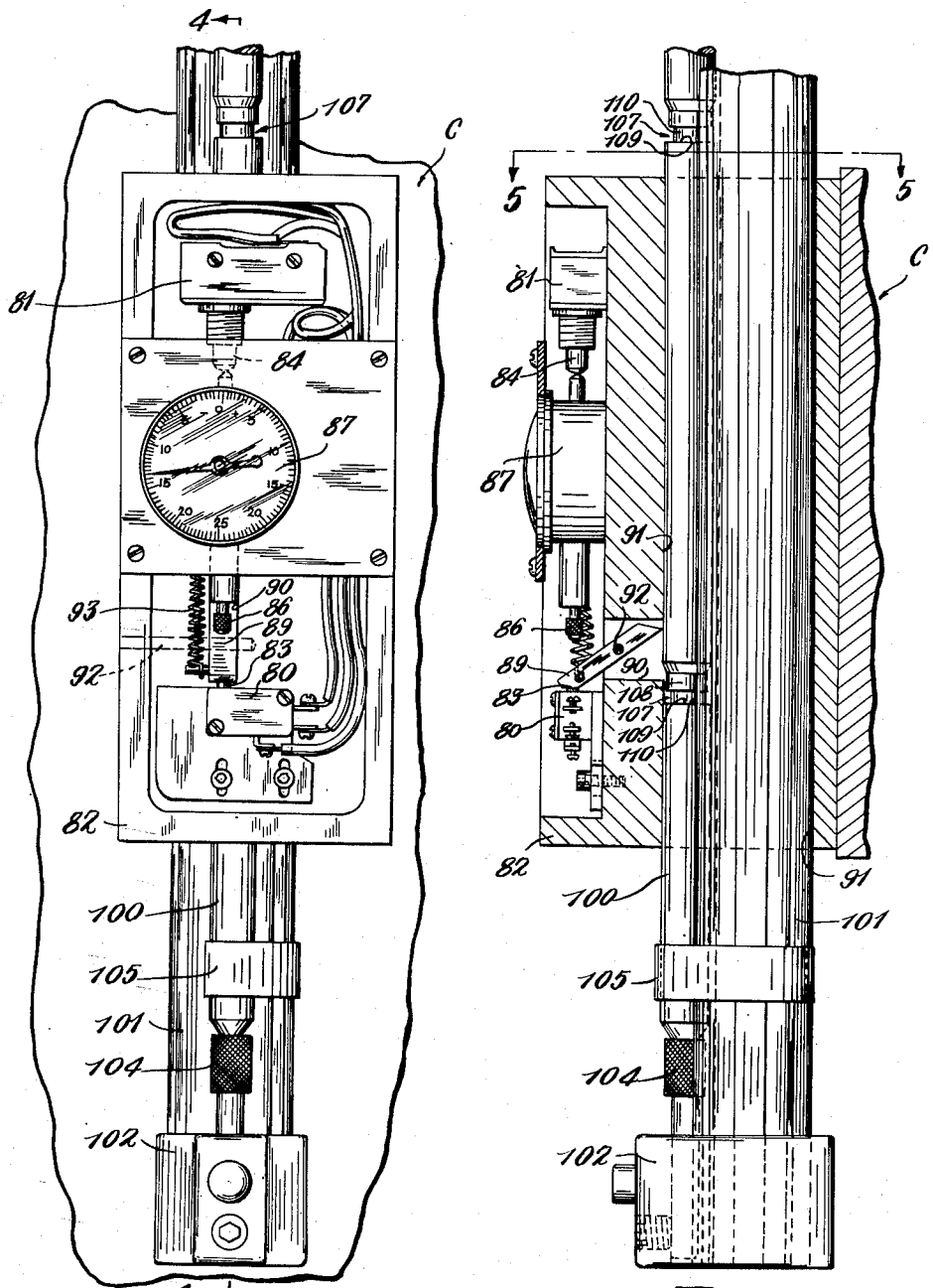

Jan. 26, 1954 H. N. STEPHAN 2,667,105
COMBINED HORIZONTAL BORING, DRILLING, AND MILLING MACHINE
Filed April 21, 1950 6 Sheets-Sheet 4

INVENTOR.
HALLIS N. STEPHAN
BY
ATTORNEYS

Jan. 26, 1954     H. N. STEPHAN     2,667,105
COMBINED HORIZONTAL BORING, DRILLING, AND MILLING MACHINE
Filed April 21, 1950     6 Sheets-Sheet 5

INVENTOR.
HALLIS N. STEPHAN
BY Hudson, Boughton,
Williams, David & Hoffmann.
ATTORNEYS INVENTOR.
HALLIS N. STEPHAN
BY Hudson, Boughton,
Williams, David & Hoffmann.
ATTORNEYS Patented Jan. 26, 1954

2,667,105

UNITED STATES PATENT OFFICE 2,667,105

COMBINED HORIZONTAL BORING, DRILLING, AND MILLING MACHINE

Hallis N. Stephan, Cleveland Heights, Ohio, assignor to The New Britain Machine Company, New Britain, Conn., a corporation of Connecticut Application April 21, 1950, Serial No. 157,269

6 Claims. (Cl. 90—16)

1

The present invention relates to machine tools comprising power actuated mechanism for automatically indexing or positioning a movable machine tool element thereof to or in a predetermined desired position to within a fraction of a thousandth of an inch in response to the actuation of a control element. The invention more particularly relates to combined horizontal boring, drilling, and milling machines comprising power indexing or positioning mechanism of the character referred to.

The principal object of the invention is the provision of a novel and improved machine tool and more particularly a combination horizontal boring, drilling and milling machine comprising power actuated or driven mechanism for indexing or sequentially positioning a movable machine tool element automatically to or in a plurality of predetermined positions to within a fraction of a thousandth of an inch merely by operation of a control member to initiate movements of the machine tool element, and which mechanism can, with little if any change therein, be conveniently used with conventional end measuring rods.

A more specific object of the invention is the provision of a novel and improved machine tool and more particularly a combination horizontal boring, drilling and milling machine comprising power actuated or driven mechanism for indexing or successively positioning a movable machine tool element thereof automatically to or in a plurality of predetermined positions to within a fraction of a thousandth of an inch merely by actuation of a control element, and which mechanism includes a detachable or removable rodlike member having a plurality of abutments spaced longitudinally therealong at predetermined positions and a member adapted to travel along the rod and engage the abutments for controlling the positioning of the machine tool element.

The invention resides in certain novel constructions and combinations and arrangements of parts and further objects and advantages will be apparent to those skilled in the art to which it relates from the following description of the preferred embodiment described with reference to the accompanying drawings forming a part of this specification in which similar reference characters designate corresponding parts, and in which;

Fig. 2 is a diagrammatic view of a portion of

Figure 1:
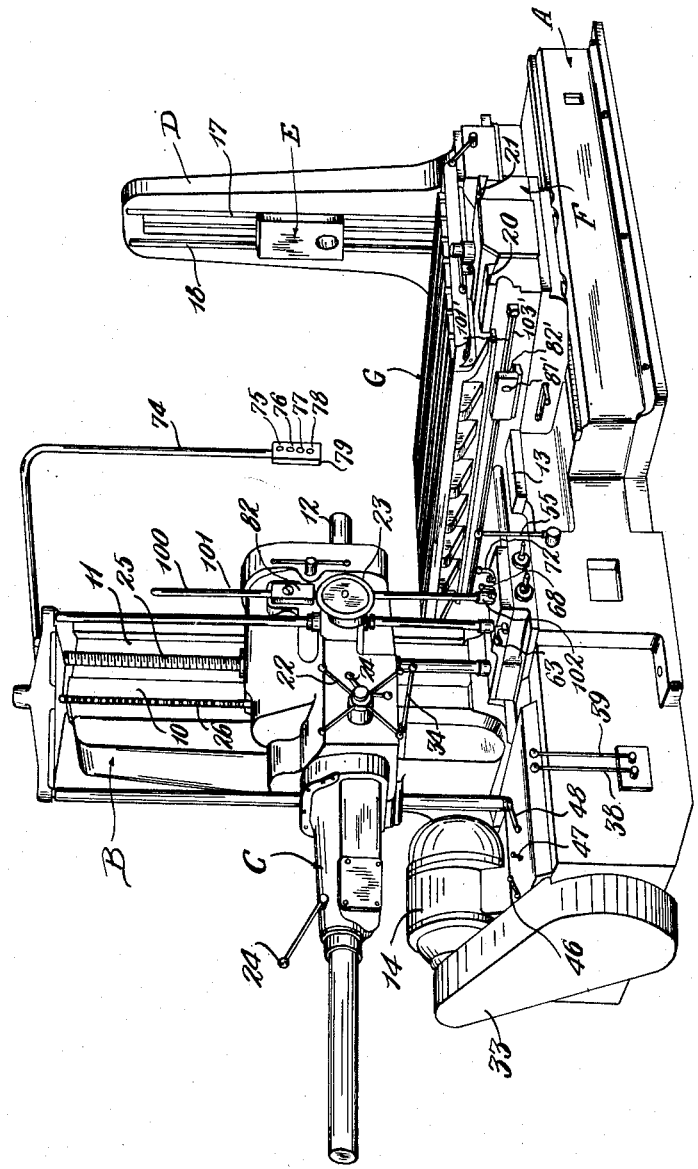
Fig. 1 is a perspective view of a combined horizontal boring, drilling and milling machine embodying the present invention.
Figure 5:
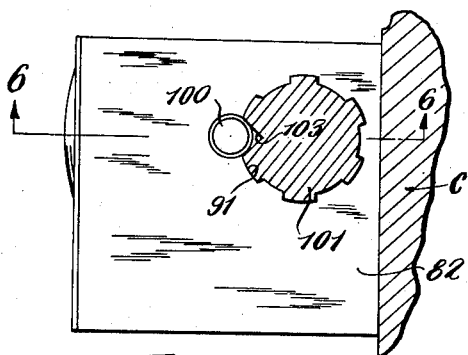
Figure 7:
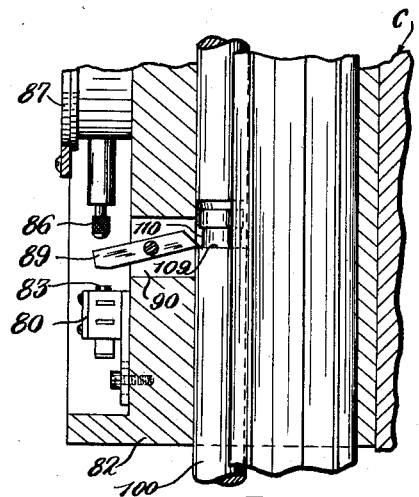
Figure 6:
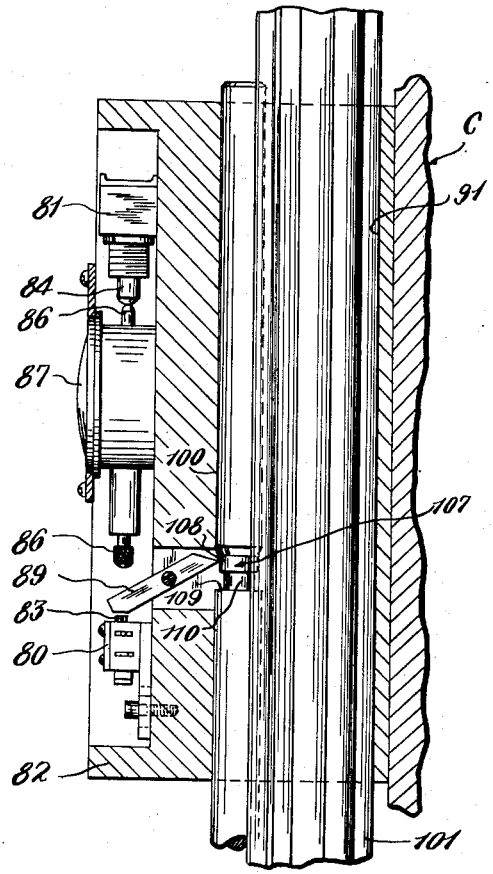
Figure 8:
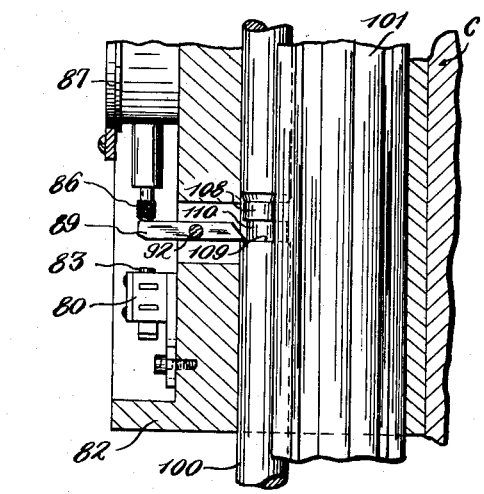
Figure 12:
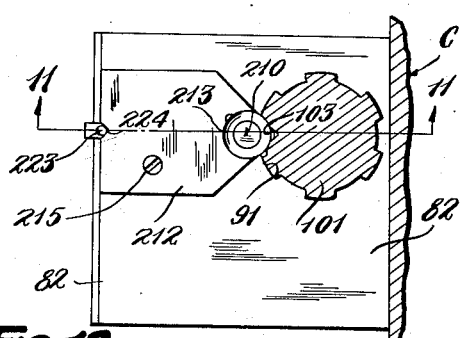
Figure 10:
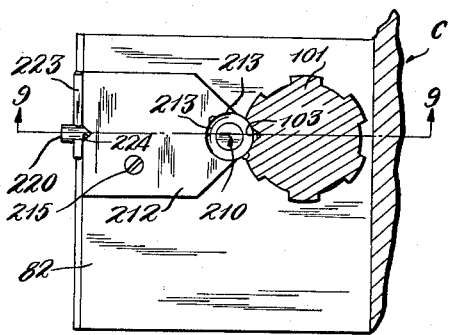
Figure 11:
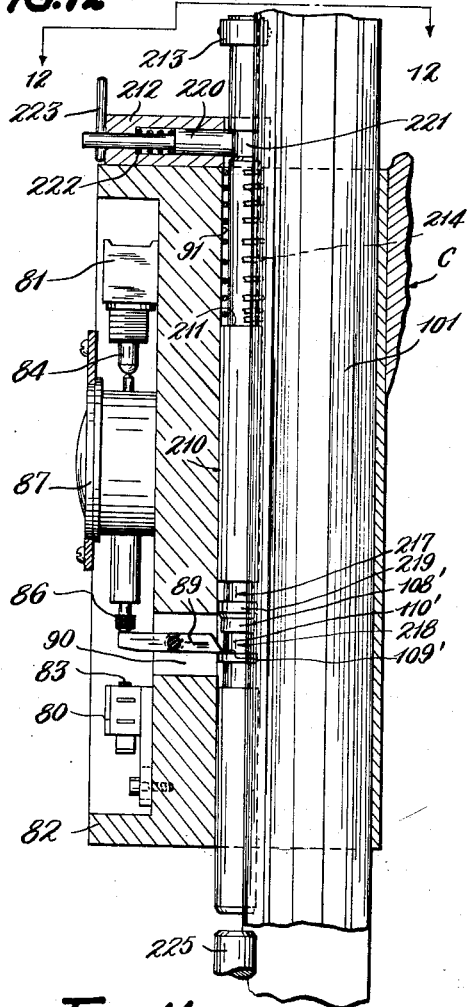
Figure 9:
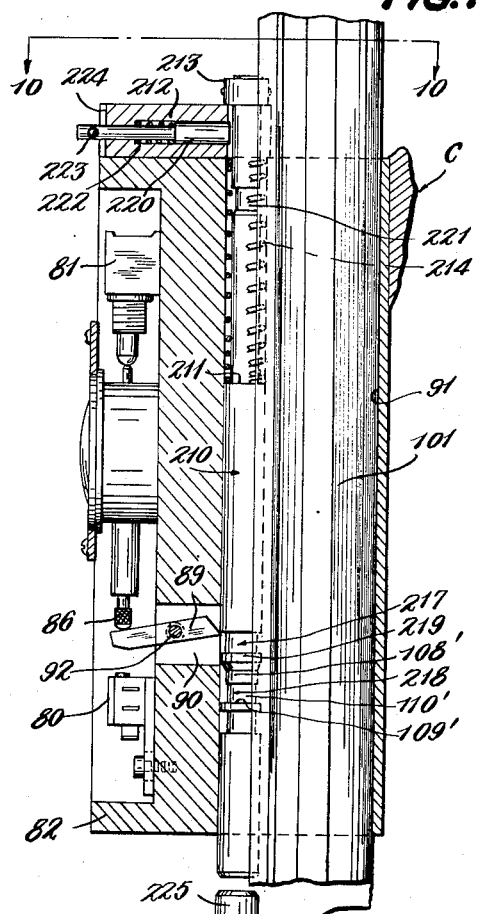

2 the drive mechanism for moving the spindle head, saddle and table of the machine shown in Fig. 1;

Fig. 3 is an enlarged fragmentary front view with parts broken away, looking directly at a portion of the spindle head and showing part of the indexing or positioning mechanism;

Fig. 4 is a sectional view approximately on the line 4—4 of Fig. 3;

Fig. 5 is a sectional view approximately on the line 5—5 of Fig. 4;

Figs. 6, 7, 8 are views somewhat similar to Fig. 4 but showing the parts in sequential operating positions during the automatic positioning of the spindle head in a desired location;

Fig. 9 is a view similar to Fig. 4 and taken approximately on line 9—9 of Fig. 10 showing a mechanism by which the spindle head can be automatically positioned by the use of conventional end measuring rods;

Fig. 10 is a sectional view on the line 10—10 of Fig. 9;

Fig. 11 is a view similar to Fig. 9 and taken on line 11—11 of Fig. 12, showing the parts set for manual control of the spindle head for positioning the spindle head by the use of conventional end measuring rods;

Fig. 12 is a sectional view taken approximately on line 12—12 of Fig. 11, and

Figure 13:
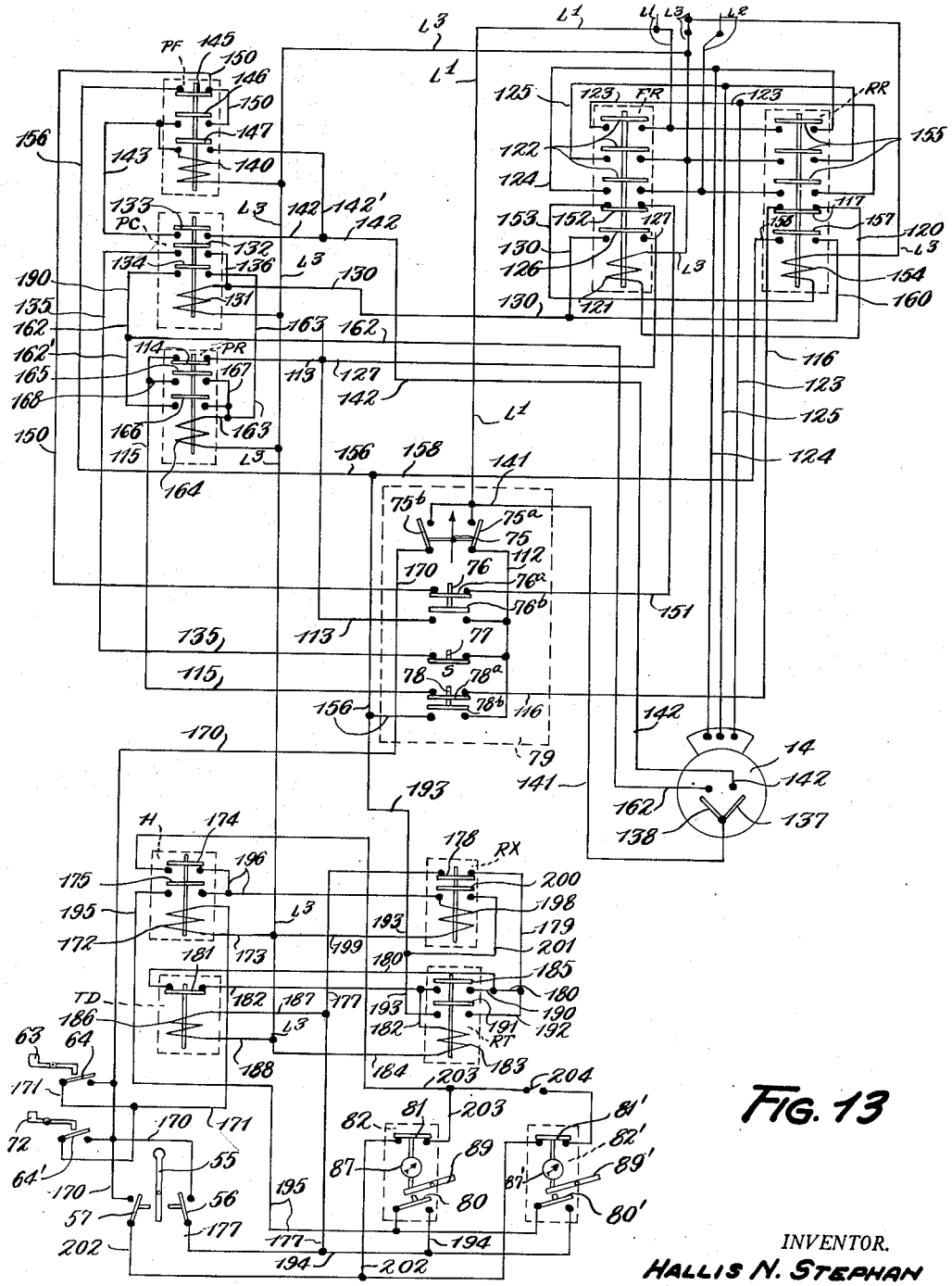

Fig. 13 is a wiring diagram of that part of electrical mechanism of the machine which is involved in the present invention.

Although the invention is susceptible of various modifications and alternative constructions, it is particularly applicable to and is herein shown and described as embodied in a combined horizontal boring, drilling and milling machine of the general character shown in United States Patent No. 2,350,174, issued May 30, 1944.

As shown in the drawings, the machine comprises a generally rectangular-shaped base A provided at one end with a vertical spindle head column B having ways 10, 11 on its front face upon which ways a spindle head C, provided with a generally horizontal spindle 12, is mounted for vertical movement, and at the other end with a vertical backrest or outboard support column D slidably supported for movement toward and from the spindle head column B on a pair of horizontal main ways 13, only one of which is shown in the drawings. The backrest column D is provided with vertical ways 17, 18 upon which the backrest block E is mounted for vertical movement. In addition to the outboard support column D, the bed ways 13 slidably support a saddle F for movement towards and from the spindle head column B. The saddle F has on its upper side transversely extending, horizontal ways 20, 21 which, in turn, slidably support a work table G for movement in a horizontal plane transversely of the axis of the spindle 12.

The spindle 12 is rotated in opposite directions and moved axially in opposite directions at different selectable speeds in a conventional manner by a power drive which includes an electric motor 14 located on the base A, and a gear transmission T driven by the motor, which power drive is described more fully hereinafter. The spindle 12 is adapted to be rapidly traversed by a separate electric motor, not shown, carried on the spindle head by conventional mechanism. Provision is made for manually moving the spindle 12 axially by a rapid traverse turnstile 22 and a feed hand wheel 23, and the spindle is selectively connected with the power feed mechanism by a control 24. The mechanism for moving the spindle is conventional and is therefore not described in detail.

The spindle head C is adapted to be moved vertically by a lead screw 25 rotatably supported in the frame and threaded in a nut fixed in the spindle head. The spindle head is counterbalanced by a counterweight, not shown, attached to the head by a chain 26. The lead screw 25 is adapted to be rotated in either direction at a relatively slow, or feed rate, or at a relatively high speed, or rapid traverse rate, by conventional manually operated devices or by the motor driven gear transmission T as described more fully hereinafter.

The backrest block E is adapted to be moved vertically by a vertically extending lead screw, not shown, located in the column D and threaded in a nut fixed to the outboard support. The outboard support lead screw is coupled with the drive mechanism for lead screw 25 so that the spindle head and outboard support E move vertically in unison, as is conventional in this type of machine tool.

The saddle F and the table G are both adapted to be moved in opposite directions and at either feed or rapid traverse along their respective ways by lead screws, not shown, which may be manually operated or they may be selectively driven in one direction or the other by the motor driven gear transmission T, as described more fully hereinafter.

The motor 14 is connected to the power input shaft 30 of the transmission T by a drive belt 32 enclosed in a housing 33. The output shaft 35 of one section of the transmission T is driven at selected speeds through shiftable gears 36, 37, which gears are controlled by levers 38, 39, respectively. Shaft 35 is drivingly connected with the spindle 12 through a drive which includes a vertically extending splined shaft 40 driven by shaft 35 through suitable miter gears. The speed at which the spindle 12 is driven can be further controlled by a lever 34 which operates shiftable back gearing, not shown, located in the spindle head.

Another section of the gear transmission includes an output shaft 41 which is adapted to be selectively connected with a gear 42 rotatably supported hereon and driven at various selectable speeds from the shaft 35 through gearing which includes shiftable gears 43, 44, 45, the positions of which gears are controlled by levers 46, 47, 48, respectively. The shaft 41 is selectively connected with gear 42 by a clutch member 50 slidingly keyed on the shaft and movable into and out of clutching engagement with a clutch element fixed to one side of gear 42. The clutch member 50 is also adapted to be moved into and out of clutching engagement with a second driving clutch element fixed to one side of a gear 51, rotatably supported on a shaft 41, to connect shaft 41 in driving engagement with the latter gear. The gear 51 is driven at a relatively high rate of speed and in an opposite direction to that of gear 42 by gear 52 driven by a gear 53 on shaft 30. The gear 51 provides a relatively high speed drive for rapid traverse movements of the power moved machine tool elements.

Figure 2:
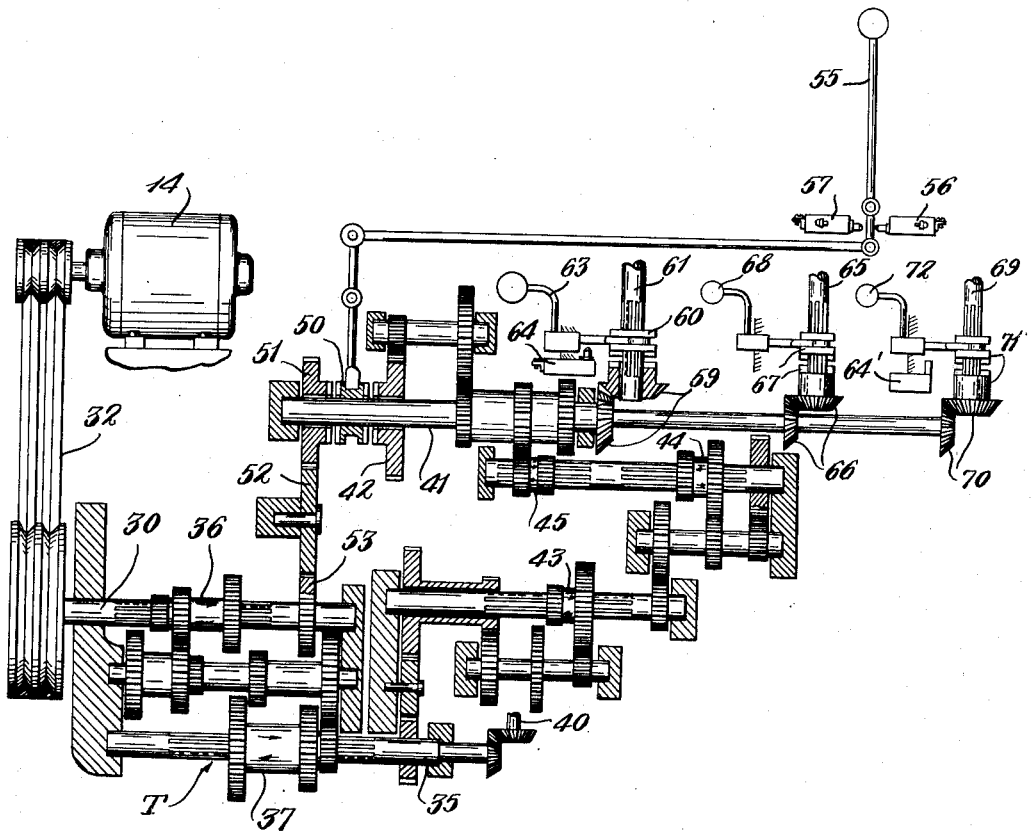

The position of the clutch member 50 is controlled by a lever 55, to which it is connected by suitable linkage, and movement of the lever to the right, as seen in Figs. 1 and 2, connects shaft 41 to gear 42 for feed movement, and movement of the lever to the left connects the shaft with gear 51 for rapid traverse movement. The lever 55 also operates to close normally open electric switches 56, 57 when it is moved from its neutral position, shown in Fig. 2, to the left and right, respectively, which switches are included in an automatic control circuit for the motor 14 described in detail hereinafter.

The shaft 41 is adapted to be selectively connected through miter gears 59 and a clutch 60 to a shaft 61 operatively connected with the lead screw 25, and the lead screw for the backrest block E for moving the spindle head C and block E vertically in unison. The connections between the shaft 61 and the lead screws mentioned are not shown as such constructions are well known. The clutch 60 is controlled by an operating lever 63 which also closes a normally opened switch 64 when it is moved to engage the clutch.

The lead screw for moving saddle F along its ways is driven by a shaft 66 adapted to be selectively connected with shaft 41, through miter gears 66 and a clutch 67, which clutch is controlled by a lever 68. The lead screw for moving table G along its ways transversely of the spindle axis is driven by a shaft 69 adapted to be selectively connected with shaft 41 through miter gears 70 and a clutch 71, which clutch is operated by a lever 72. The lever 72 is adapted to close a normally open switch 64' when it is moved to engage the clutch. Preferably, the clutch operating levers 63, 68 and 72 have suitable interlocking mechanisms for preventing engagement of more than one clutch at any one time. Interlocking mechanisms suitable for the purpose are well known and they are therefore not shown.

The operation of motor 14 may be controlled by the machine operator through a control system including controllers 75, 76, 77, 78 located in a movable pendent contact box 79 supported at a convenient location by a conduit 74 attached to the machine. The controller 75 is referred to as a "selector" and it may be moved to or set in a "neutral" position, a "manual" position, which sets up a manual control for the motor, or an "automatic" position to provide for so-called automatic control of the motor. The controller 76 is referred to as the "forward" controller and comprises a normally closed switch 76a and a normally open switch 76b which are opened and closed, respectively, by depressing a switch operating member, and the motor 14 is operated in its forward direction when the switch operating member is depressed. Controller 77, referred to as a "stop" controller, comprises a switch which is biased closed and is effective to stop the motor when it is opened by depressing its operating member. Controller 78 is referred to as a "reverse" controller and comprises a normally closed switch 78a and a normally open switch 78b which are opened and closed, respectively, by an operating member when the member is depressed, and the motor 14 is operated in its reverse direction when the switch operating member is depressed.

The control for the motor 14, in addition to controllers 75, 76, 77, 78 just mentioned, includes switches 64, 64' previously referred to, and switches 80, 81 and 80', 81' which latter pairs of switches are operated according to certain vertical movements of the spindle head C and horizontal movements of the table G, respectively.

The switches 80, 81 are fixedly located in a housing 82 attached to the spindle head C, and may be the so-called "Microswitch" type having operating members 83, 84, respectively. The switch 80 is normally biased open and the switch 81 is normally biased closed. The switch operating member 84 is actuated by a plunger 86 of a dial indicator type micrometer 87 which is attached in the housing 82. The switch operating member 83 and the plunger 86 are actuated to close and open switches 80, 81, respectively, by the forward end of a control member 89 pivoted in an opening 90 in the housing 82, which opening communicates with a vertical opening 91 through the housing. The member 89 is pivoted in the opening 90 by a pin 92 and is biased clockwise, as seen in Fig. 4, by a spring 93 so that the rear end tends to project into the opening 91.

The rear end of control member 89 is adapted to engage and slide along the surface of a vertically extending rod 100 supported or carried by a splined stationary shaft 101 which extends vertically through the opening 91 and the lower end of which shaft is supported by a bracket 102 secured to the machine base A. The shaft 101 has a V groove 103 extending lengthwise in the front side thereof, which groove is adapted to receive conventional measuring rods or the rod 100, or rods similar to rod 100. The rod 100 or the end measuring rods, as the case may be, are bottomed on an anvil 104 suitably attached in the bracket 102 and are detachably secured in the groove 103 by one or more clips 105 which are C shaped spring members having hook formations at the ends which engage the front and rear sides of the rods and shaft 101 to hold the rods in the groove. The cross sectional configuration of the opening 91, as shown, corresponds to that of the shaft 101 and the attached rod 100, which rod, as shown, is of the same general form and diameter as the conventional end measuring rod to be used with the machine.

The rod 100 has a plurality of peripheral recesses or grooves 107 formed therein at predetermined intervals corresponding to the spacings of the successive head positions desired. Each of the grooves or recesses 107 has an abutment 108, in the form of a section slightly reduced in diameter relative to the rod proper and an abutment 109 which is the lower side of the recess 107, and adjacent to a section 110 having a smaller diameter than the section 108. As the spindle head C moves vertically, the rear end of control member 89 engages and slides along the surface of the rod proper, and enters and leaves the recesses 107 changing the angular position of the control member and in turn actuating the switches 80, 81.

In the machine shown, provision is made for moving and indexing the table G transversely of the spindle axis in a manner similar to that in which the spindle head is moved and indexed and similar control mechanism is provided. In order to avoid unnecessary repetition, the control mechanism for the spindle head only is herein shown and described in detail and the corresponding parts for controlling the table G bear the same reference characters having a prime.

The power movements of the various machine elements, that is, the spindle head C and the backrest block E, saddle F, and table G, can be controlled manually for conventional machining operations by operating the motor 14 in one direction or the other and manipulating the clutch levers 55, 63, 68 and 72. The particular machine element to be moved is selected by operating the appropriate clutch levers 63, 68 or 72, as described hereinbefore, and the lever 55 is moved to the right, as viewed in Fig. 2, to cause the transmission to drive the respective machine elements in rapid traverse, and moved to the left to cause the machine elements to be driven in feed. The direction of the rapid traverse and feed movements is controlled by control of the direction of motor operation.

In addition to the manual control of the machine element movements for conventional operations, the spindle head C together with backrest block E, and the table G can be accurately positioned automatically by control mechanism, including the rod 100, or rods similar thereto, which mechanism is operative to automatically stop the motor 14 in the rapid traverse and feed movements of the machine elements mentioned so that these elements are relatively quickly positioned to within a fraction of a thousandths of an inch of predetermined positions. The control mechanism is operative to index the positioning of the machine elements in a plurality of positions, or in a single position which can be determined with the use of one or more conventional end measuring rods.

The motor 14 may be controlled by the operator for conventional power movement of the machine elements by moving the selector 75 to close switch 75a which establishes control of the motor by the controllers 76, 77 and 78, or the machine may be set for automatic positioning by moving the selector 75 to close switch 75b.

When the selector switch 75a is closed for establishing conventional manual control of the motor 14, the motor is energized to operate in its so-called forward direction by depressing the switch operating member of controller 76 which opens normally closed switch 76a and closes normally open switch 76b thereby completing a circuit for a solenoid 121 of a relay FR, which circuit comprises line L1, switch 75a, wire 112, switch 76b, wire 113, normally closed switch 114, wire 115, normally closed switch 78a, wire 116, normally closed switch 117, wire 120, solenoid 121, to L3. Solenoid 121 then closes contactors 122 to complete the "forward" motor circuit from lines L1, L2, L3, through wires 123, 124, 125, respectively, whereupon motor 14 commences to operate in its forward direction.

The solenoid 121 closes a switch 126 which establishes a circuit from L1, through switch 75a, wire 112, switch 76b, wires 113, 127, switch 126, wire 130, solenoid 131 of a relay PC, to L3. Solenoid 131 closes switches 132, 133, 134 which establishes holding circuits for solenoids 121 and 131 through the stop switch 77 and around switch 76b to permit normal reopening of the forward switch 76b and conditions a motor plugging circuit for braking the motor when the stop switch 77 is depressed for opening the forward motor circuit. The holding circuit for solenoid 121 includes L1, selector switch 75a, wire 112, normally closed stop switch 77, wire 135, switch 132, wires 136, 130, switch 126 of relay FR, wires 127, 113, normally closed switch 114, wire 115, normally closed switch 78a, wire 116, normally closed switch 117, wire 120, solenoid 121, to L3. The holding circuit for solenoid 131 comprises L1, selector switch 75a, wire 112, normally closed stop switch 77, wire 135, switch 132, wire 136, to solenoid 131 to L3.

The motor plugging circuit includes normally opened motor operated plugging switches 137, 138 which are connected in circuits with switches 133, 134, respectively, of relay PC. Plugging switch 137 is closed during the time motor 14 operates in its forward direction and plugging switch 138 is closed during the time the motor operates in its reverse direction, both switches opening, if closed, when the motor stops. Closure of plugging switch 137 by operation of the motor energizes a solenoid 140 of a relay PF by a circuit from L1 through wire 141, plugging switch 137, wire 142, switch 133, wire 143, solenoid 140, to line L3. Solenoid 140 opens normally closed switch 145 and closes switches 146, 147, the latter of which completes a holding circuit around the switch 133 from line L1 through wire 141, plugging switch 137, wires 142, 142', switch 147, wire 143, solenoid 140, to L3. Switch 146 conditions a circuit from plugging switch 137 through wire 142, 142', switch 147, switch 146, wire 150, normally closed forward controller switch 76a, wire 151, normally closed switch 152 of relay FR, which is now held in open position by solenoid 121, wire 153, solenoid 154 of the relay RR, to line L3. The motor plugging control circuit at this point is conditioned to cause motor reversing circuit contactors 155 to be closed by solenoid 154 when solenoid 121 is deenergized.

The forward operation of the motor is stopped by opening switch 77 which breaks the circuit for solenoids 121 and 131, causing motor circuit contactors 122 and relay switches 132, 133 to open. Switch 152 is closed upon deenergization of solenoid 121 which completes a circuit through solenoid 154, as described, and the motor reversing contactors 155 are closed to plug the motor. When the motor stops, plugging switch 137 opens to break the circuit for solenoids 140 and 154, which opens the motor reversing contactors 155 and deenergizes the motor circuit.

The motor 14 is operated in its reverse direction by depressing the controller member 78 to open normally closed switch 78a and close the normally open controller switch 78b which establishes a circuit for the solenoid 154 from L1 through selector switch 75a, wire 112, reverse controller switch 78b, wire 156, normally closed switch 145, wire 150, normally closed forward controller switch 76a, wire 151, normally closed switch 152, wire 153, solenoid 154, to L3. Solenoid 154 closes contactors 155 which connect the motor windings in circuit to operate the motor in its so-called reverse direction, and it also closes a switch 157 which energizes solenoid 131 by a circuit from L1 through switch 75a, wire 112, switch 78b, wires 156, 158, switch 157, wires 160, 130, solenoid 131, to line L3. Solenoid 131 closes switch 132 to form a holding circuit for solenoids 154, 131 around switch 78b and through the normally closed stop switch 77, the circuit for solenoid 154 comprising L1, selector switch 75a, wire 112, stop switch 77, wire 135, switch 132, wires 136, 130, 160, switch 157, wires 158, 156, normally closed switch 145, wire 150, normally closed forward controller switch 76a, wire 151, normally closed relay switch 152, wire 153, solenoid 154, to line L3. The circuit for solenoid 131 comprises L1, selector switch 75a, wire 112, stop switch 77, wire 135, switch 132, wire 136, solenoid 131 to L3.

Reverse operation of the motor 14 closes plugging switch 138 which establishes a circuit from L1 through wire 141, plugging switch 138, wires 162, relay switch 134, wire 163, solenoid 164 of relay PR, to L3. Solenoid 164, closes switches 165, 166, the latter switch providing a holding circuit for solenoid 164 around switch 134 by a circuit including motor plugging switch 138, wire 162, 162', switch 166, wire 163, solenoid 164 to L3. Switch 165 conditions a motor plugging control circuit, which causes solenoid 121 to close the forward circuit contactors 122 when the reverse contactors 155 open by deenergization of solenoid 154.

The reverse operation of motor 14 is stopped by opening stop switch 77 which breaks the circuits for solenoids 154 and 131, causing contactors 155 to open and deenergize the reverse motor circuit, and relay switch 117 to reclose, thereby energizing the solenoid 121 which closes contactors 122 to plug the motor. The plugging circuit for solenoid 121, comprises line L1, wire 141, plug switch 138, wires 162, 162', switch 166, wire 167, switch 165, wires 168, 115, normally closed controller switch 78a, wire 116, switch 117, wire 120, solenoid 121, to L3. The motor quickly stops and plugging switch 138 opens to deenergize the control circuit.

It will be seen that the operator can move the spindle head C and backrest E in either rapid traverse or feed in either direction desired by controlling the direction of operation of the motor 14 and throwing lever 55 to one position or the other, and in the present embodiment the mechanism is so arranged that when the motor operates in its forward direction the lever 55 is operative to cause the spindle head to be elevated in rapid traverse and to be lowered in feed when the lever is in its right and left hand positions, respectively, and vice versa when the motor is operated in reverse. The saddle F and table G are moved along their ways, similarly when their feed screws are connected with transmission shaft 41 by operation of the clutch levers 68, 72.

When it is desired to automatically index or successively position the spindle head C together with backrest block E in a plurality of predetermined operating positions, the rod 106, having the recesses 107 formed therein at the proper intervals and of precise dimensions, is clamped in the groove 108 of the shaft 101 as described hereinbefore. The spindle head C is moved to its raised position, that is to say, above the uppermost desired predetermined operating position, by manual control of the motor and clutch levers, as described and this may be done before rod 106 is in place. If rod 106 is in place prior to the elevation of the spindle head, the rear end of control member 89 is held from entering the recesses 107 of the rod during upward movement of the spindle head. The control member 89 is released to cause the rear end thereof to engage the rod 107 proper and the control member will then be in the position shown in Fig. 4. The selector controller 75 is then moved to the automatic control position which closes selector switch 75b to connect the automatic control circuits with the power lines and opens switch 75a to disconnect the switches of controllers 76, 77 and 78 from the motor control circuit.

Assuming that lever 55 is in its neutral position and it is desired to move the spindle head C to its first indexed position, clutch lever 63 is thrown to engage lead screw 25 with shaft 41 of the gear transmission and at the same time it closes switch 64. Switch 64 completes a circuit from L1 through switch 75b, wire 170, switch 64, wires 171, solenoid 172 of relay H, wire 173 to L3. Solenoid 172 closes switches 174, 175 to condition a circuit for the solenoid 121 of the starter contactor relay FR. The operator then moves lever 55 to the left which clutches shaft 41 to the rapid traverse gear 51 and closes switch 56. Switch 56 completes a circuit from line L1 through selector switch 75b, wire 170, switch 56, wires 177, normally closed switch 178 of relay RX, wires 179, 180, time delay switch 181, wire 182, solenoid 183 of relay RT, wire 184 to line L3. Solenoid 183 closes switches 185, 191. At the same time a circuit is established through solenoid 186 for the time delay switch 181 from switch 56, wires 177, 187, solenoid 186, wire 188, to line L3. The time delay switch 181 remains closed momentarily, after which the circuit for solenoid 183 is maintained from wire 179 through wires 180, 190, switch 185, wire 182, solenoid 183, wire 184 to L3, which provides a holding circuit around time delay switch 181.

Solenoid 183 also closes switch 191 which completes a circuit from wire 179 through wire 192, switch 191, wires 193, 156, normally closed switch 145 of relay PF, wire 150, normally closed forward controller switch 76a, wire 151, normally closed switch 152 of relay FR, wire 153, solenoid 154, to line L3. Solenoid 154 closes contactors 155 and operates the motor 14 in its reverse direction, causing the spindle head C to move downwardly in rapid traverse. The inner end of control member 89 engages the rod 100 proper as it moves downwardly and holds switch 80 closed, as seen in Fig. 4.

As mentioned previously, switch 64, which is closed by the clutch lever 63 when the lever is moved to connect the lead screw 25 with the gear transmission, completes a circuit for solenoid 172 of relay H which relay closes switches 174, 175. Switch 175 is in series with switch 80, and a circuit is established from wire 177, which is connected with line L1 through switch 56 as previously described, through wire 194, control switch 80, wire 195, switch 175, wire 196, solenoid 198 of relay RX, wire 199 to line L3. Solenoid 198 opens normally closed switch 178 and closes switch 200, the latter switch completing a holding circuit for solenoid 154 from wire 177 through wire 194, switch 80, wire 195, switch 175, wire 196, switch 200, wires 201, 193, 156, normally closed switch 145, wire 150, normally closed switch 76a, wire 151, normally closed switch 152, wire 153, solenoid 154, to L3. Switch 157 is closed by solenoid 154 and completes a circuit for solenoid 131 from wire 193, through wires 156, 158, switch 157, wires 160, 130, solenoid 131 to L3. Solenoid 131 closes switch 134 completing the circuit for solenoid PR, which closes switches 165, 166 to condition a motor plugging circuit including solenoid 121, which plugging unit is completed through switch 117 of relay RR when solenoid 154 is deenergized, as described hereinbefore.

The spindle head C is lowered by rapid traverse movement until the inner end of control member 89 enters the first groove or recess 107 in the rod 100, as seen in Fig. 6, and strikes the abutment 108, which causes the control member to rotate to open switch 80. Opening of switch 80 deenergizes solenoids 131 and 154 which breaks the motor circuit at contactors 155 and recloses relay switch 117 to establish the motor plugging circuit from line L1 through wire 141, motor plugging switch 138, wires 162, 162', switch 166 of relay PR, wire 167, switch 165, wires 168, 115, normally closed reverse controller switch 78a, wire 116, normally closed relay switch 117, wire 129, solenoid 121 of relay FR, to L3. Solenoid 121 closes contactors 122 to energize the motor 14 for forward operation which plugs the motor and when the motor stops, the solenoid 121 is deenergized by the switch 138 reopening. By the time the motor is stopped, the spindle head will have coasted to a point at which the rear end of the control member 89 is in approximately the position shown in Fig. 7 with the forward end intermediate switch operating member 83 and plunger 86 and the rear end engaging the lower side 109 of the recess 107.

The operator then moves lever 55 to the right which clutches the transmission output shaft 41 with gear 42 to drive the shaft in the opposite direction in feed, and which also closes switch 57. Switch 57 establishes a circuit from line L1 through selector switch 75a, wire 170, switch 57, wire 202, normally closed switch 81, wires 203, switch 174 of relay H, wire 196, solenoid 198, wire 199 to line L3. Solenoid 198 closes switch 200 to complete a circuit for solenoid 254 of relay RR from wire 196, through switch 200, wires 201, 193, 156, normally closed switch 145, wire 150, normally closed forward controller switch 76a, wire 151, normally closed switch 152, wire 153, solenoid 154, to L3. Solenoid 154 closes contactors 155, to operate the motor in reverse which causes the spindle head C to be moved upwardly at a feed rate. Solenoid 154 also closes switch 157 to complete the circuit for solenoid 121 of relay PC as described in relation to the rapid traverse movement.

As the spindle head moves upwardly at feed, the control member 89 rotates clockwise with the rear end thereof in engagement with the lower side 109 of the recess 107 and the outer end of the control member is gradually moved against plunger 86 by spring 93, as seen in Fig. 8, and operates to open switch 81 at a predetermined position of the spindle head C relative to the shoulder 109 on the rod 100. Opening of switch 81 breaks the circuit for solenoid 154 which opens contactors 155 to deenergize the reverse circuit of the motor. The motor is plugged to a quick stop by the closure of contactors 122 by solenoid 121, the circuit of which is completed by the motor plugging circuit described hereinbefore and which includes plugging switch 138, switches 166, 165 of relay PR, normally closed reverse switch 78a, and switch 117 of relay RR. The spindle head C is thereby accurately positioned automatically for the desired machining operation.

In the present embodiment, it is desired to always position the spindle head by moving the head upwardly at feed rate, and for this reason, the motor is operated in its so-called reverse direction during the automatic indexing operations.

After the spindle head is positioned, the table G may likewise be positioned by operating clutch lever 72 to connect the table lead screw with the transmission shaft 41 as described, which lever also closes a switch 64' which is in parallel with switch 64 and performs the same control functions as the latter. Lever 55 may then be operated as described relative to the rapid traverse and feed positioning of the spindle head, and the automatic control circuits operate similarly to that described, the only exceptions being that switches 80', 81' of the table positioning control, which correspond to switches 80, 81, are connected in parallel circuit with the latter switches respectively, and operate in place of the latter switches. A control switch 204 is connected in series with switch 81' and is open except when the table G is to be automatically positioned.

Each succeeding or indexing position of the spindle head is automatically achieved by the operation of lever 55 and the clutch controls 63, 72, as described, and as the spindle head is lowered, the inner end of control member 89 enters and leaves the successive recesses 107 of rod 100 to effect control of switches 80, 81 as described. It is to be noted that the time delay switch 181 establishes a control circuit for energizing the solenoid 154 independently of the control switch 80 only for a period of time which enables the switch 80 to be reclosed, following an automatic positioning operation, by the member 89 moving out of the respective grooves 107 as the spindle head C moves downwardly relative to rod 100.

If desired, the movements of saddle F could be automatically controlled similar to the spindle head by providing switch mechanisms and controls therefor like the switches 56, 57, 64, 80, 81, 204 and the rod 100.

The limits of movements of the machine elements by power are preferably controlled by suitable limit switches which deenergize the control circuits as the machine elements approach the limits of their travel. Such limit switches have not been shown as they are well known in the art.

In some instances, it may be desirable to accurately position the machine elements mentioned either automatically by power or manually by the use of conventional end measuring rods instead of the rod 100 or similar rods, and in which event the control rod 100 is removed from the shaft 101 and housing 82, and a so-called master pin or rod 210 is substituted therefor. The rod 210 is adapted to be associated with the housing 82 in such a manner that the motor circuit control member 89 is operated according to the position of the spindle head C, for example, as determined by the use of conventional end measuring rods or it may be set to operate the micrometer dial to indicate the position of the spindle head by the use of end measuring rods when the spindle head is positioned manually. The rod 210 is of the same general diameter as the rod 100 and its upper end portion is reduced in diameter to form a shoulder 211 and is adapted to be slidingly received in an opening through a block 212 at one end of the latter. The upper end of the rod 210 has a colar 213 thereon which engages the upper side of the block 212 to prevent withdrawal of the rod from the block opening, and position the rod for the purpose described hereinafter. A coil spring 214 is interposed between the shoulder 211 and the underside of the block 212 and tends to urge the rod 210 downwardly as viewed in Figs. 9 and 11. The block 212 is adapted to be secured to the top surface of the box 82 by a bolt 215 with the rod 210 extending downwardly in the opening 91 through the box in the grove 103 of the shaft 101.

The lower portion of rod 210 has two groove portions 217 and 218 separated by an annular shoulder or abutment 219. The groove formation 218 is like that of the grooves 107 of rod 100 and corresponding portions have like reference characters bearing primes. The grove 217 is adapted to be aligned with the rear end of the control member 89 when the rod 210 is in its lower position, i. e., with collar 213 abutting the block 212 as seen in Fig. 9, and the grove 218 is adapted to be aligned with rear end of the control member 89 by raising the rod to the position shown in Fig. 11.

The rod 210 can be locked in the raised position by a plunger 220 which is slidable in an opening in the block 212 normal to the opening which receives the rod, and is adapted to engage in a groove 221 in the rod to hold the rod in the raised position. The plunger 220 is biased toward the rod 210 by a coil spring 222 and the outer end of the plunger has a pin 223 extending laterally therefrom, which pin is adapted to engage the outer end face of the block to hold the plunger in the position seen in Figs. 9, 10, and to be received in a groove 224 in the outer face of the block 212, to permit the plunger 220 to enter the rod groove 221 as seen in Figs. 11, 12. It will be noticed that the groove 221 is slightly wider than the end of the plunger 220 engaged therein so that the rod may be moved vertically a slight amount while the pin is engaged in the groove. When it is desired to automatically control the motor 14 for positioning of the spindle head C by use of one or more end measuring rods, the rod 210 is positioned as shown in Fig. 9 and one or more conventional end measuring rods, an end of one of which is indicated at 225, is positioned on the anvil 104 and held in the shaft groove 103 by one or more clips 105 so that the lower end of rod 210 engages the upper end of the measuring rod when the spindle head C is lowered. The control mechanism is set for automatic operation by the selector 75 as described hereinbefore, and the lever 55 is moved to the left to cause the spindle head to be lowered in rapid traverse movement. Rod 210 is carried by the spindle head until the lower end thereof engages the upper end of the end measuring rod 225 which arrests downward movement of the rod 210, but the housing 82 continues moving downwardly relative to the rod 210 so that the rear end of the control member 89 engages abutment 219 and is rotated to close switch 80. Then as the rear end of the control member 89 enters groove 218, it moves into engagement with abutment 108' and opens switch 80 to stop the rapid traverse movement as described hereinbefore with reference to the operation of the control circuits by use of the rod 100. The spindle head will coast after the switch 80 is opened until the control member 89 is in a position corresponding to that seen in Fig. 7. Lever 55 is then moved to the left by the operator, causing the spindle head to be moved upwardly in feed and relative to rod 210 which is held to the end measuring rod 225 by spring 214, until the rear end of member 89 engages the lower side 109' of recess 218, and rotates to engage the plunger 86 and operate switch 81 to stop the motor 14, as described hereinbefore. By use of one or more conventional end measuring rods of the proper lengths the spindle head can be automatically positioned as desired, which eliminates the necessity of providing a control rod similar to rod 100 and having one or more recesses 107 spaced for the desired positioning.

In the event that it is desirable to accurately position the spindle head by solely manual control, the rod 210 is elevated to the position shown in Fig. 11 and secured by plunger 220 as described. When the rod 210 is in the position shown, the rear end of the control member 89 engages the lower side 109' of the groove 218 and the outer end presses against the gauge stem 86 to urge the gauge to a zero or other suitable reference points. As the spindle head is lowered by manual operation, at the instant the rod 210 engages the end measuring rod 225 its downward travel is arrested and continued downward movement of the spindle head and the housing 82 causes the forward end of the control member 89 to tend to move from the plunger 86 and actuate the indicator of the micrometer 87 and thereby indicate to the operator that the exact desired position of the spindle head has been attained.

It will of course be understood that the table G is adapted to be positioned similarly to that described with reference to the spindle head, and if desired, the saddle F could likewise be provided with similar control mechanisms.

It is apparent that by my invention a combination boring, drilling and milling machine tool has been provided which has control mechanism for automatically and successively positioning or indexing one or more of the power positioned machine elements, and which control mechanism can be modified by the mere substitution of control operating members, to position the machine elements with the usual end measuring rods either by power or by manual movements of the machine elements.

While the preferred embodiment of the invention has been described in considerable detail, it is to be understood that other constructions, adaptations and modifications thereof may be employed falling within the claims which follow.

Having thus described my invention, I claim:

1. In combination with a machine or the like having a supporting member, a member movably supported upon said supporting member and power means for moving said last-named member relative to said supporting member, of electric switch means for controlling the operation of said power means, a rod-like gauge member having signal means thereon, signal detection means responsive to said signal means when in predetermined position relative thereto for effecting the operation of said switch means to stop said supported member in a predetermined position relative to said supporting member, means adapted to receive rod-type end measuring gauges for detachably connecting said gauge member to one of said first two mentioned members, and means for connecting said signal detection means to the other of said first two mentioned members.

2. In combination with a device having a supporting member, a member movably supported upon said supporting member and power means for moving said last-named member relative to said supporting member, of electric switch means for controlling the operation of said power means, a rod-like gauge member having abutment means thereon, a movable control member adapted to cooperate with said abutment means upon movement of said supported member for effecting the operation of said switch means to stop said supported member in a predetermined position relative to said supporting member, means adapted to receive rod-type end measuring gauges for detachably connecting said gauge member with one of said first two mentioned members, and means for connecting said movable control member to the other of said first two mentioned members.

3. In combination with a machine or the like having a supporting member, a member movably supported upon said supporting member and power means for moving said last-named member relative to said supporting member, of electric switch means for controlling the operation of said power means, a rod-like gauge member having a plurality of longitudinally spaced abutment means thereon, a movable control member adapted to cooperate with said abutment means upon movement of said supported member for effecting the operation of said switch means to stop said supported member in predetermined positions relative to said supporting member, means adapted to receive rod-type end measuring gauges for detachably connecting said gauge member to one of said first two mentioned members, and means for connecting said movable control member to the other of said first two mentioned members.

4. In combination with a machine or the like having a supporting member, a member movably supported upon said supporting member and power means for moving said last-named member in opposite directions relative to said supporting member, of electric switch means for controlling the operation of said power means, a rod-like gauge member having abutment means thereon, a movable control member adapted to cooperate with said abutment means upon movement of said supported member for effecting the operation of said switch means to stop said supported member, means for reversing the direction of movement of said supported member, said movable control member being also adapted to cooperate with said abutment means upon movement of said supported member in the reverse direction for again effecting operation of said switch means to again stop said supported member, means adapted to hold rod-type end measuring gauges for detachably connecting said gauge member to one of said first two mentioned members, and means for connecting said movable control member to the other of said first two mentioned members.

5. In combination with a machine tool or the like having a supporting member, a member movably supported upon said supporting member and power means for moving said last-named member relative to said supporting member, of electric switch means for controlling the operation of said power means, control means comprising relatively movable signal means and signal detection means responsive to said signal means when in predetermined position relative thereto for effecting the operation of said switch means to stop said supported member in a predetermined position relative to said supporting member, means for operatively connecting said control means to one of said first two mentioned members, and means comprising a rod-type end measuring gauge detachably connected to the other of said first two mentioned members for producing relative movement between said signal means and said signal detection means, upon movement of said supported member relative to said supporting member.

6. In combination with a machine tool or the like having a supporting member, a member movably supported upon said supporting member and power means for moving said last-named member relative to said supporting member, of electric switch means for controlling the operation of said power means, control means comprising a first member having abutment means thereon and a second member, said first and second members being movable relative to each other and said second member being adapted to cooperate with said abutment means for effecting the operation of said switch means upon movement of said supported means to stop said supported member in a predetermined position relative to said supporting member, means for operatively connecting said control means to one of said first two mentioned members, and means comprising a rod-type end measuring gauge detachably connected to the other of said first two mentioned members for producing relative movement between said first and second members.

HALLIS N. STEPHAN.

References Cited in the file of this patent

UNITED STATES PATENTS

| Number | Name | Date |
|---|---|---|
| 2,236,881 | Rusnak | Apr. 1, 1941 |
| 2,400,819 | Gallimore et al. | May 21, 1946 |
| 2,516,842 | Baker | Aug. 1, 1950 |